United States Patent
Dirksen

(10) Patent No.: US 9,563,191 B2
(45) Date of Patent: Feb. 7, 2017

(54) SYSTEMS AND METHODS OF STORAGE AND AUTOMATED SELF-CHECK AND OPERATIONAL STATUS OF RIG TOOLS

(75) Inventor: Ronald Johannes Dirksen, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 622 days.

(21) Appl. No.: 14/113,429

(22) PCT Filed: Aug. 8, 2011

(86) PCT No.: PCT/US2011/046928
§ 371 (c)(1),
(2), (4) Date: Oct. 23, 2013

(87) PCT Pub. No.: WO2013/022424
PCT Pub. Date: Feb. 14, 2013

(65) Prior Publication Data
US 2014/0052290 A1    Feb. 20, 2014

(51) Int. Cl.
G06F 19/00    (2011.01)
G05B 15/02    (2006.01)
E21B 47/00    (2012.01)

(52) U.S. Cl.
CPC ............... *G05B 15/02* (2013.01); *E21B 47/00* (2013.01)

(58) Field of Classification Search
CPC .................................. G05B 15/02; E21B 47/00
USPC ........................................................ 700/175
See application file for complete search history.

(56) References Cited

U.S. PATENT DOCUMENTS

| | | | |
|---|---|---|---|
| 2,918,651 A | 12/1959 | Podolak et al. | |
| 4,452,075 A | 6/1984 | Bockhorst et al. | |
| 4,620,302 A * | 10/1986 | Binoeder | G01R 31/31937 714/700 |
| 2003/0164645 A1* | 9/2003 | Crandell, III | B23K 9/1006 307/80 |
| 2008/0125877 A1* | 5/2008 | Miller | G05B 15/02 700/29 |
| 2008/0295568 A1* | 12/2008 | Nanaji | B67D 7/085 73/1.34 |
| 2009/0210096 A1* | 8/2009 | Stack | F24F 11/0009 700/278 |

FOREIGN PATENT DOCUMENTS

GB     2384140 A     7/2003

OTHER PUBLICATIONS

International Search Report and Written Opinion, International Application No. PCT/US2011/046928, 11 pgs., Apr. 5, 2012.

* cited by examiner

Primary Examiner — Robert Fennema
Assistant Examiner — Sivalingam Sivanesan
(74) Attorney, Agent, or Firm — Alan Bryson; Baker Botts L.L.P.

(57) ABSTRACT

A method and system for autonomously monitoring, evaluating, storing and testing tools and other units operated at a rig-site. The system may include a storage facility communicatively coupled to one or more tools, status flags identifying the health and operational status of the tools, and a computer for performing a self-check for determining the operational status for the one or more tools. The system may further include a remotely positioned computer system in communication with the operational status of the tools, and a user terminal in communication with the computer system.

20 Claims, 4 Drawing Sheets

SYSTEMS AND METHODS OF STORAGE AND AUTOMATED SELF-CHECK AND OPERATIONAL STATUS OF RIG TOOLS

CROSS-REFERENCE TO RELATED APPLICATION

This application is a U.S. National Stage Application of International Application No. PCT/US2011/046928 filed Aug. 8, 2011, and which is hereby incorporated by reference in its entirety.

BACKGROUND

The present invention relates generally to monitoring and testing well drilling and completion operations and, more particularly, to methods and systems for monitoring, evaluating, storing and testing tools and other units operated at a rig-site.

Hydrocarbons, such as oil and gas, are commonly obtained from subterranean formations. The development of subterranean operations and the processes involved in removing hydrocarbon from the subterranean formation are complex. These complex operations require a number of different tools that perform steps such as, for example, drilling the wellbore at a desired site, treating the wellbore to optimize production of hydrocarbons, and performing the necessary steps to produce and process the hydrocarbons from the subterranean formation.

Each of these different steps involve a plurality of drilling tools that typically perform the subterranean operations. These tools may include tools that are constantly in use, or only in use for certain intervals. Tools that are only in operation for intervals may get lost or misplaced without a proper and designated storage container. For instance, at each stage of the subterranean operations, it is important to ensure the availability of required tools for the performance of different steps of the subterranean operations. Moreover, at each step, it is important to ensure that the tools are operational. In particular, if a tool has been out of use for a limited period of time, that tool may need to be tested to ensure that the tool is working properly. As a further example, each stage of the subterranean operations may require a variety of tools, and transporting each of those tools may be difficult and time consuming to verify that each tool is properly sent to the site.

The performance of testing for each of these tools, along with the time and energy spent searching for the required tool at a particular stage of the subterranean operations, is time consuming, inefficient, and could also hamper efforts if one or more tools is missing or not in operation when needed. With the increasing demand for hydrocarbons and the desire to minimize the costs associated with performing subterranean operations, there exists a need for automation of storage and performance of a periodic self check on these tools to optimize and automate rig operations so that tools can be readily transported, located, and tested.

BRIEF DESCRIPTION OF THE DRAWINGS

Some specific example embodiments of the disclosure may be understood by referring, in part, to the following description and the accompanying drawings.

DETAILED DESCRIPTION

Figure 1:
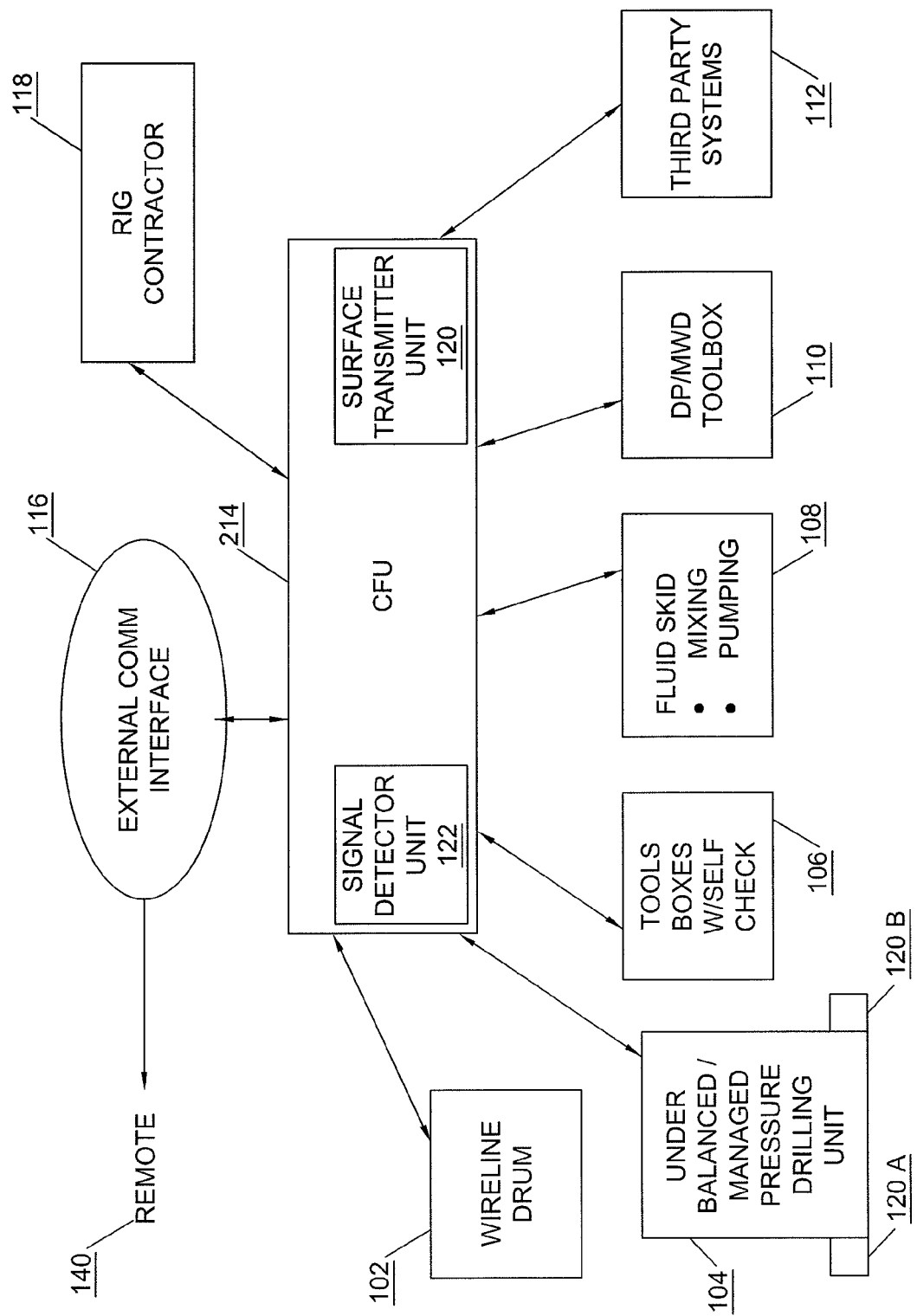
FIG. 1 shows an illustrative improved drilling system in accordance with an exemplary embodiment of the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein, are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present invention is directed to improving efficiency of subterranean operations and more specifically, to a method and system for monitoring, evaluating, testing, and storing tools and other units during the performance of subterranean operations.

Turning to FIG. 1, an Integrated Control System ("ICS") in accordance with an exemplary embodiment of the present invention is denoted generally with reference numeral 100. The ICS 100 may also implement a centralized monitoring system using a Central Functional Unit ("CFU") 114. The system may contain one or more functional units at the rig site that require monitoring. The functional units may include one or more of a wireline drum 102, underbalanced/managed pressure unit 104, tool boxes containing self-check 106, fluid skid 108, including mixing and pumping units, and measurement while drilling toolbox 110. The functional units may include third party functional units 112.

Each functional unit may be communicatively coupled to the CFU 114. For some embodiments of the invention, the CFU 114 may provide an interface to one or more suitable integrated drive electronics drives, such as a hard disk drive (HDD) or compact disc read only memory (CD ROM) drive, or to suitable universal serial bus (USB) devices through one or more USB ports. In certain embodiments, the CFU 114 may also provide an interface to a keyboard, a mouse, a CD-ROM drive, and/or one or more suitable devices through one or more firewire ports. For certain embodiments of the invention, the CFU may also provide a network interface through which CFU can communicate with other computers and/or devices.

In one embodiment, the CFU 114 may be a Centralized Data Acquisition System. In certain embodiments, the connection may be an Ethernet connection via an Ethernet cord. As would be appreciated by those of ordinary skill in the art, with the benefit of this disclosure, the functional units may be communicatively coupled to the CFU 114 by other suitable connections, such as, for example, wireless, radio, microwave, or satellite communications. Such connections are well known to those of ordinary skill in the art and will therefore not be discussed in detail herein. In one exemplary embodiment, the functional units could communicate bidirectionally with the CFU 114. In another embodiment, the functional units could communicate directly with other functional units employed at the rig-site.

In one exemplary embodiment, communication between the functional units may be by a common communication protocol, such as the Ethernet protocol. For functional units that do not communicate in the common protocol, a converter may be implemented to convert the protocol into a common protocol used to communicate between the functional units. With a converting unit, a third party such as a Rig Contractor 118, may have their own proprietary system communicating to the CFU 114. Another advantage of the present invention would be to develop a standard data communication protocol for adding new parameters.

In one embodiment, the functional units may record data in such a manner that the CFU 114 using software can track and monitor all of the functional units. The data will be stored in a database with a common architecture, such as, for example, Oracle, SQL, or other type of common architecture.

The data from the functional units may be generated by sensors 120A and 120B, which may be coupled to appropriate data encoding circuitry, such as an encoder, which sequentially produces encoded digital data electrical signals representative of the measurements obtained by sensors 120A and 120B. While two sensors are shown, one skilled in the art will understand that a smaller or larger number of sensors may be used without departing from the scope of the present invention. The sensors 120A and 120B may be selected to measure downhole parameters including, but not limited to, environmental parameters, directional drilling parameters, and formation evaluation parameters. Such parameters may include downhole pressure, downhole temperature, the resistivity or conductivity of the drilling mud and earth formations. Such parameters may include downhole pressure, downhole temperature, the resistivity or conductivity of the drilling mud and earth formations, the density and porosity of the earth formations, as well as the orientation of the wellbore. Sensor examples include, but are not limited to: a resistivity sensor, a nuclear porosity sensor, a nuclear density sensor, a magnetic resonance sensor, and a directional sensor package. Additionally, formation fluid samples and/or core samples may be extracted from the formation using formation tester. Such sensors and tools are known to those skilled in the art. In an embodiment, the sensors may be based on a standard hardware interface that could add new sensors for measuring new metrics at the rig-site in the system.

In one example, data representing sensor measurements of the parameters discussed above may be generated and stored in the CFU 114. Some or all of the data may be transmitted by data signaling unit. For example, an exemplary function unit, such as an underbalanced/managed pressure drilling unit 104 may provide data in a pressure signal traveling in the column of drilling fluid to the CFU 114 may be detected at the surface by a signal detector unit 122 employing a pressure detector in fluid communication with the drilling fluid. The detected signal may be decoded in CFU 114. In one embodiment, a downhole data signaling unit is provided as part of the MPD unit 104. The data signaling unit may include a pressure signal transmitter for generating the pressure signals transmitted to the surface. The pressure signals may include encoded digital representations of measurement data indicative of the downhole drilling parameters and formation characteristics measured by sensors 120A and 120B. Alternatively, other types of telemetry signals may be used for transmitting data from downhole to the surface. These include, but are not limited to, electromagnetic waves through the earth and acoustic signals using the drill string as a transmission medium. In yet another alternative, drill string may include wired pipe enabling electric and/or optical signals to be transmitted between downhole and the surface. In one example, CFU 114 may be located proximate the rig floor. Alternatively, CFU 114 may be located away from the rig floor. In certain embodiments, a surface transmitter 120 may transmit commands and information from the surface to the functional units. For example, surface transmitter 120 may generate pressure pulses into the flow line that propagate down the fluid in drill string, and may be detected by pressure sensors in MPD unit 104. The information and commands may be used, for example, to request additional downhole measurements, to change directional target parameters, to request additional formation samples, and to change downhole operating parameters.

In addition, various surface parameters may also be measured using sensors located at functional units 102 . . . 112. Such parameters may include rotary torque, rotary RPM, well depth, hook load, standpipe pressure, and any other suitable parameter of interest.

Any suitable processing application package may be used by the CFU 114 to process the parameters. In one embodiment, the software produces data that may be presented to the operation personnel in a variety of visual display presentations such as a display.

The operations will occur in real-time and the data acquisition from the various functional units need to exist. In one embodiment of data acquisition at a centralized location, the data is pushed at or near real-time enabling real-time communication, monitoring, and reporting capability. This allows the collected data to be used in a streamline workflow in a real-time manner by other systems and operators concurrently with acquisition.

As shown in FIG. 1, in one exemplary embodiment, the CFU 114 may be communicatively coupled to an external communications interface 116. The external communications interface 116 permits the data from the CFU 114 to be remotely accessible by any remote information handling system communicatively coupled to the remote connection 140 via, for example, a satellite, a modem or wireless connections. In one embodiment, the external communications interface 116 may include a router.

In accordance with an exemplary embodiment of the present invention, once feeds from one or more functional units are obtained, they may be combined and used to identify various metrics. For instance, if there is data that deviates from normal expectancy at the rig site, the combined system may show another reading of the data from another functional unit that may help identify the type of deviation. For instance, if a directional sensor is providing odd readings, but another sensor indicates that the fluid is being pumped nearby, that would provide a quality check and an explanation for the deviation. As would be appreciated by those of ordinary skill in the art, with the benefit of this disclosure, a CFU 114 may also collect data from multiple rig-sites and wells to perform quality checks across a plurality of rig-sites.

Figure 2:
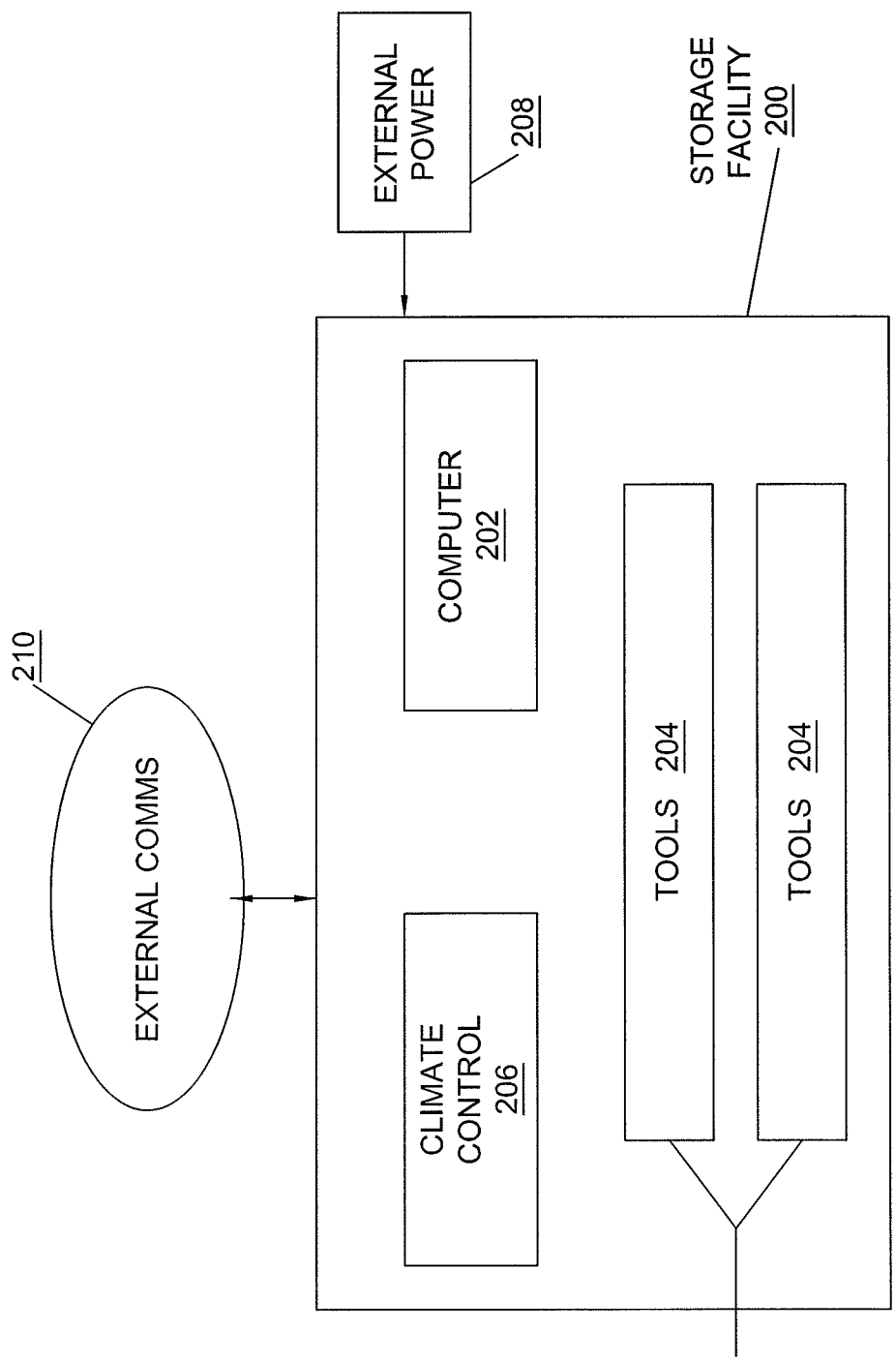
FIG. 2 shows an exemplary storage unit in accordance with an exemplary embodiment of the present invention.

FIG. 2 depicts a storage facility functional unit in accordance with an exemplary embodiment of the present invention for storing and automatically testing tools. The storage facility may store various tools 204 that would be used to perform subterranean operations. In one embodiment, the storage facility 200 may include a computer which may, for example, provide the self-checking software for testing the tools 204. The tools 204 may include tools in constant use, such as calibration, logging, measurement while drilling tools, or other tools as would be used to perform subterranean operations that would be known to a person of ordinary skill in the art. These tools 204 may also comprise tools which the operator only needs periodically. The tools 204 would be connected in such a manner that each tool receives power from the storage facility 200 via a power source. In one embodiment, the power source may connect to an external power source 208 supplying current to the storage facility 200 to test and charge the tools 204. The storage facility 200 may also comprise various slots that serve as placeholders for the tools 204. As would be appreciated by those of ordinary skill in the art, with the benefit of this disclosure, the storage facility 200 may provide placeholders to store tools in a central location to prevent the tools from getting misplaced at the rig-site.

In one exemplary embodiment, the storage facility 200 may further include a computer 202. In one embodiment, the computer 202 may also include self-checking software. As would be appreciated by those of ordinary skill in the art, with the benefit of this disclosure, the self-checking software may initiate a check of the various tools 204 for the storage facility 200. Each tool may comprise status flags indicating the status of the tools 204 connected to the storage facility 200. These flags, in one embodiment, may comprise red, yellow, or green to identify the status of the tool. Other embodiments of the status flags are also contemplated by the invention and the description is not intended to limit the types of indicators such as status flags that indicate the health and operational status of the various tools 204 connected to the storage facility 200. The flags, in another embodiment, do not necessarily have to be physical embodiments, and can also be present in software in the computer 202. The computer may also store the results of the self-tests.

In one exemplary embodiment, the status flags which comprise red, yellow, or green status flags could indicate the following status. A self-check that results in a red status flag could indicate that there is a fault with the tool. A self-check result that shows a yellow status flag could indicate a caution with the tool. A self-check result that shows a green status flag would indicate that the tool succeeded the self-test and is operational. In another embodiment, if a piece of equipment has recently arrived at the rig-site, initially before any testing or use, the equipment could load up as yellow to indicate that a self-check has not been performed. If the initial self-check results in the tool in operational condition, the status flag would reset to green.

In another embodiment, the operational flag status may indicate that a caution or fault exists at the rig site. For example, based on a tool that triggers a caution or fault flag, an operator at the rig-site can check if a parameter is out of an indicated tolerance. The operator may also check for an external circumstance for the fault. Once the parameter is back to within tolerance, the self-check may be initiated again to see if the operational status of the tool is back to functioning properly.

The storage facility 200 may store the tools 204 by means of a distribution panel for the wiring for the tools. Tools generally have a single communication type connector, such as, for example, a custom Ethernet connection. Communications may occur under any available protocol that enables communications between the tools, such as an Ethernet protocol.

If an equipment or tool at the rig is only used periodically, it can be stored in, or on the storage facility 200. The automated system can ensure via a self-check that the instrument is working properly. If an equipment indicates a fault or caution indication, then that report can be automatically sent to an on-site operator, remote operator, or any other remote location via an external communications interface 210. Additionally, in an embodiment, the computer 202 can also send an indication to the repair and maintenance support department, or any other monitoring station for replacement or repair of the tool. This would prevent the need for testing a tool that is only used periodically when that tool is needed. Additionally, this would prevent having to replace a tool or not having a tool on-site when it is needed for performance of a particular stage of the subterranean operations.

The storage facility 200 of FIG. 2 may also include a climate control component 206. The climate control component 206 may regulate the temperature of the storage facility 200 to maintain the health of the various tools 204 that may be connected to the storage facility 200. In one embodiment, the climate control component 206 may include a cooling component to adjust the temperatures for the various tools. Other embodiments may be known to those of ordinary skill in the art.

Figure 3:
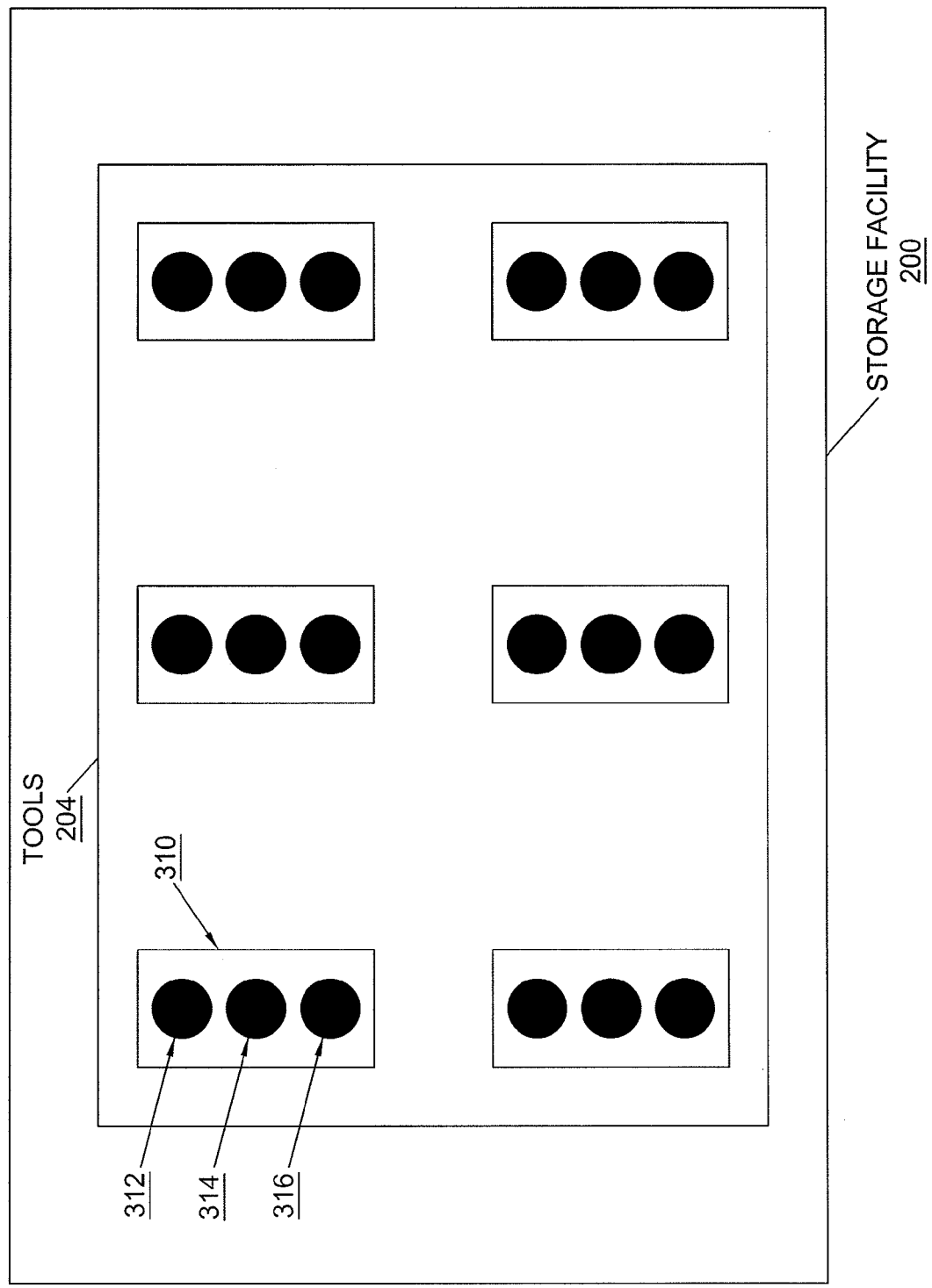
FIG. 3 shows another view of the storage facility.

FIG. 3 illustrates an exemplary embodiment of the options for the status flags of the storage facility 200 in accordance with the invention. As shown in FIG. 3, the various tools 204 may each or collectively be communicatively coupled to a set of status flags. In the exemplary embodiment, the status flags may be identified by a three-color panel using the red, yellow, and green color scheme.

The self-test for the tools may be initiated by the computer system 202, based on a predetermined time, or initiated by the tool. Other embodiments are also encompassed by this disclosure. A rig operator or any other personnel with proper access can set a designated time for performing a self-check for the tools. For example, a rig operator may enter a self-test to be performed per week for a tool, or daily for another tool. The computer system 202 may initiate the self-test by an operator or based on the predetermined time. The tool itself may initiate a self-test based on logic in the boxes for the tools, such as when it first arrives at a rig-site for the storage facility 200.

Upon initiation of a self-test, either by the computer system, based on a predetermined time, or initiated by the tool, the status of each tool would be displayed by the operational status flags, such as 312, 314, and 316 communicatively coupled to that tool via a connection facility 310. The storage facility 200 may comprise connections for all of the various types of tools, including connections for expansion of tools that can also be attached to the storage facility 200. In one embodiment, the storage facility 200 may initiate an engine self-check for a cement pump. Once the cement pump is attached to the storage facility 200, the cement pump may be monitored remotely and a diagnostic can be performed to determine the health and operational status of the pump autonomously and remotely via the external communications interface 116.

Another example embodiment of the storage facility 200 may contain a connection for a wireline skid tool. The wireline skid tool may be connected in such a manner as to link to one set of status flags or multiple sets of status flags based on the embodiment.

The storage facility 200 may also provide for quick transportation to and from a rig-site. The storage facility 200 can be designed to contain placeholders for the commonly used or full set of tools required for the subterranean operations. In transporting materials to the rig-site, a storage facility 200 may be transported to ensure a necessary and common set of tools to always be present at the rig-site to perform the subterranean operations. In one embodiment, the size of the storage facility 200 may comprise fifteen to twenty-five feet, such that the storage facility 200 may be transportable in a container on a truck.

Another advantage of the present invention is that the storage facility 200 would prevent the need for a person to constantly hook up and test equipment and tools that need to be used periodically to check for health and operational status of the tools. This would prevent further downtime by eliminating the need to replace the tool that needs to be used and is determined to be faulty when needed. Such self-checks performed once the tool is on the storage facility 200 can readily identify these issues with sufficient time to make repairs or order replacements.

Another advantage of the present invention is that the storage facility 200 will provide a common set of tools, including wireline and other measurement while drilling tools that can be loaded on the storage facility for performing the subterranean operations. The storage facility 200 may be plugged into the external power source 208. Communication may be established via a communications link, and once that communication is established, the computer 202 may initiate a self-check and each of the tools 204 attached to the storage facility 200 may have their health and operational status determined autonomously without having to plug in each separate tool to check the health and operational status.

Once the central functional unit 214 receives an alert from indicating that the status of one of the tools is red or yellow, the central functional unit 214 can process the data and alert an operator regarding the status. This information may be sent to a technical monitoring station or team to replace or fix the tool.

Figure 4:
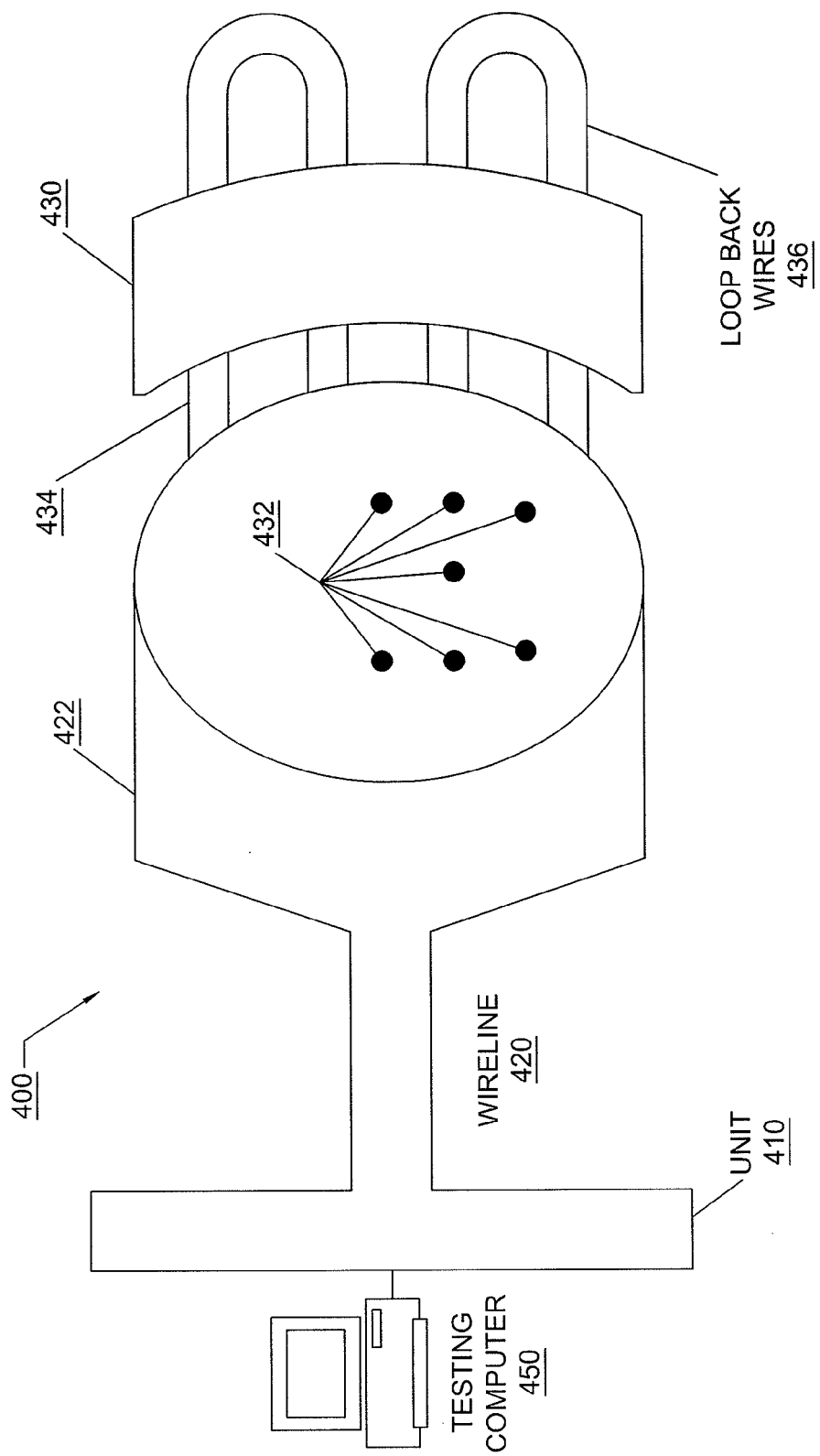
FIG. 4 is an example embodiment of a self-check utility.

FIG. 4 shows another embodiment for performing a self-test on tools, including, but not limited to, pumps or wireline units, at the rig-site. FIG. 4 is an example implementation of a self-check utility 400 that performs a loopback test for a tool to determine if the tool is working properly. At one end of the cable, a unit 410 is attached to a testing computer 450 to initiate a loopback test. The loopback test ensures conductivity and electrical isolation across the conductors is within the designated specification for the tool. In one embodiment, the test is performed using a battery. Connections 432 and 434 comprise male and female connections, in one embodiment, attached to the tool. In one embodiment, the tool is connected via a screw in the protective cap 430. A protective cap 430 contains loopback wires 436 for retransmitting the electrical current through and through. On one end, current is injected through to ensure that no leakage is present or break is present in the wireline unit. The result may be stored on the testing computer 350.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

The invention claimed is:

1. A system for storing and checking the operational status of tools, the system comprising:
   a storage facility;
   wherein the storage facility is communicatively coupled to one or more tools;
   wherein the storage facility comprises a computer communicatively coupled to one or more tools;
   at least one memory;
   at least one processor, the at least one processor executing the steps comprising:
   performing a self-check process to determine operational status for the one or more tools, wherein the self-check process comprises a loopback test, wherein the loopback test tests conductivity and electrical isolation across conductors of the one or more tools is within a designated specification for the one or more tools;
   setting a status flag identifying the operational status for the one or more tools based at least in part on the result of the self-check.

2. The system of claim 1, wherein the self-check process is initiated by the computer.

3. The system of claim 1, wherein the self-check process is initiated by logic in the tool.

4. The system of claim 1, wherein the self-check process is initiated based on a predetermined setting.

5. The system of claim 4, wherein the predetermined setting is a time unit.

6. The system of claim 1, further comprising a climate control component to maintain the operational status of the tools.

7. The system of claim 1, further comprising an external power source, wherein the external power source provides current to the one or more tools.

8. The system of claim 1, wherein the computer is communicatively coupled to a remote information handling system.

9. The system of claim 1, further comprising a centralized data acquisition server, wherein the central data acquisition server comprises a user interface, wherein the user interface is capable of providing access to the system, wherein the access may be one of local or remote to the rig.

10. A method for storing and checking the operational status of tools, the method comprising:
    storing one or more tools on a storage facility, wherein the storage facility is communicatively coupled to one or more tools, further wherein the storage facility comprises a computer communicatively coupled to one or more tools;
    performing a self-check on the one or more tools, wherein the self-check determines the operational status for the one or more tools, wherein the self-check process comprises a loopback test, wherein the loopback test tests conductivity and electrical isolation across conductors of the one or more tools is within a designated specification for the one or more tools;
    setting a status flag identifying the operational status for the one or more tools based at least in part on the result of the self-check.

11. The method of claim 10, wherein the self-check is initiated by the computer.

12. The method of claim 10, wherein the self-check is initiated by logic in the tool.

13. The method of claim 10, wherein the self-check is initiated based on a predetermined time unit setting.

14. The method of claim 10, further comprising a climate control component to maintain the operational status of the tools.

15. The method of claim 10, further comprising an external power source, wherein the external power source provides current to the one or more tools.

16. The system of claim 10, wherein the computer is communicatively coupled to a remote information handling system.

17. The system of claim 10, further comprising a centralized data acquisition server, wherein the central data acquisition server comprises a user interface, wherein the user interface is capable of providing access to the system, wherein the access may be one of local or remote to the rig.

18. A system for storing and checking the operational status of tools, the system comprising:
    a central functional unit at a rig site comprising a central data acquisition server communicatively coupled to one or more functional units;
    wherein the one or more functional units comprises a storage facility, wherein the storage facility stores tools;
    wherein the storage facility further comprises operational parameters indicating the status of the tools based on a self-check, wherein the self-check process comprises a loopback test, wherein the loopback test tests conductivity and electrical isolation across conductors of the one or more tools is within a designated specification for the one or more tools.

19. The system of claim 18, wherein the one or more functional units communicate with the central functional unit through a common communication protocol.

20. The system of claim 18, wherein the storage facility further comprises a climate control component, a computer, external power, and an external communications interface.

* * * * *